United States Patent
Asokan et al.

(10) Patent No.: US 9,198,065 B2
(45) Date of Patent: Nov. 24, 2015

(54) METHODS, SYSTEMS, AND COMPUTER READABLE MEDIA FOR UTILIZING ADAPTIVE SYMBOL PROCESSING IN A MULTIPLE USER EQUIPMENT (MULTI-UE) SIMULATOR

(71) Applicant: Ixia, Calabasas, CA (US)

(72) Inventors: Ramanathan Asokan, Cary, NC (US); Ashraf Q. Siddiqui, Morrisville, NC (US)

(73) Assignee: IXIA, Calabasas, CA (US)

( * ) Notice: Subject to any disclaimer, the term of this patent is extended or adjusted under 35 U.S.C. 154(b) by 232 days.

(21) Appl. No.: 13/835,658

(22) Filed: Mar. 15, 2013

(65) Prior Publication Data

US 2014/0269361 A1   Sep. 18, 2014

(51) Int. Cl.
*H04W 24/06* (2009.01)
*H04B 17/391* (2015.01)
*H04B 17/00* (2015.01)

(52) U.S. Cl.
CPC ........... *H04W 24/06* (2013.01); *H04B 17/3912* (2015.01); *H04B 17/0085* (2013.01)

(58) Field of Classification Search
None
See application file for complete search history.

(56) References Cited

U.S. PATENT DOCUMENTS

| | | |
|---|---|---|
| 5,561,841 A | 10/1996 | Markus |
| 5,850,386 A | 12/1998 | Anderson et al. |
| 6,125,072 A | 9/2000 | Wu |
| 6,771,957 B2 | 8/2004 | Chitrapu |
| 6,996,772 B2 | 2/2006 | Justice et al. |
| 7,543,054 B1 | 6/2009 | Bansod et al. |
| 7,706,347 B2 | 4/2010 | Kim et al. |
| 7,765,313 B2 | 7/2010 | Jain et al. |
| 8,601,585 B2 | 12/2013 | Beddoe et al. |
| 8,693,571 B2 * | 4/2014 | Sorrentino .................... 375/295 |
| 8,724,498 B2 | 5/2014 | Choi et al. |
| 8,738,985 B2 | 5/2014 | Deng et al. |
| 8,793,117 B1 | 7/2014 | Varshney et al. |
| 8,855,070 B2 | 10/2014 | Deng et al. |
| 8,892,829 B2 | 11/2014 | Asokan |

(Continued)

OTHER PUBLICATIONS

"Simulating LTE Cellular Systems: An Open-Source Framework"; Piro et al.; IEEE Transactions on Vehicular Technology, vol. 60, No. 2, Feb. 2011.*

(Continued)

*Primary Examiner* — Benjamin H Elliott, IV
(74) *Attorney, Agent, or Firm* — Jenkins, Wilson, Taylor & Hunt, P.A.

(57) ABSTRACT

A method for utilizing adaptive symbol processing in a multi-UE simulator is disclosed and includes receiving a downlink signal including a plurality of downlink signal portions, wherein each of the downlink signal portions is received via one of a plurality of carriers and forwarding the downlink signal portions to a first downlink signal chain processing module belonging to a plurality of downlink signal chain processing modules, wherein symbol processing task modules associated with the plurality of downlink signal chain processing modules are grouped in logical task pools of similar symbol processing task modules. The method includes processing the downlink signal portions using the symbol processing task modules associated with the first downlink signal chain processing module. The method also includes selecting a similar symbol processing task module from the logical task pool associated with the first symbol processing task module to assist with the processing of the downlink signal portions.

45 Claims, 8 Drawing Sheets

(56) References Cited

U.S. PATENT DOCUMENTS

| | | | |
|---|---|---|---|
| 8,908,535 | B2 | 12/2014 | Campbell et al. |
| 2003/0036403 | A1 | 2/2003 | Shiu et al. |
| 2005/0220047 | A1 | 10/2005 | Baey et al. |
| 2006/0262880 | A1 | 11/2006 | Mizuta et al. |
| 2006/0276195 | A1 | 12/2006 | Nordling |
| 2007/0091921 | A1 | 4/2007 | Elliot et al. |
| 2009/0052473 | A1 | 2/2009 | Choi et al. |
| 2009/0077456 | A1 | 3/2009 | Pi et al. |
| 2009/0077457 | A1 | 3/2009 | Ramesh et al. |
| 2009/0100300 | A1 | 4/2009 | Kim et al. |
| 2009/0109926 | A1 | 4/2009 | Meylan |
| 2009/0196244 | A1 | 8/2009 | Chun et al. |
| 2009/0245187 | A1 | 10/2009 | Nam et al. |
| 2010/0075678 | A1 | 3/2010 | Akman et al. |
| 2010/0165847 | A1 | 7/2010 | Kamuf et al. |
| 2010/0184447 | A1 | 7/2010 | Miki et al. |
| 2010/0195743 | A1 | 8/2010 | Barsoum et al. |
| 2010/0272011 | A1 | 10/2010 | Palanki et al. |
| 2010/0290371 | A1 | 11/2010 | Beale |
| 2010/0303011 | A1 | 12/2010 | Pan et al. |
| 2010/0331030 | A1 | 12/2010 | Nory et al. |
| 2011/0032925 | A1 | 2/2011 | Lee et al. |
| 2011/0044196 | A1 | 2/2011 | Ishii |
| 2011/0076962 | A1 | 3/2011 | Chen et al. |
| 2011/0086659 | A1 | 4/2011 | Yoon et al. |
| 2011/0110315 | A1 | 5/2011 | Chen et al. |
| 2011/0119552 | A1 | 5/2011 | Park et al. |
| 2011/0158333 | A1 | 6/2011 | Nakano et al. |
| 2011/0170439 | A1 | 7/2011 | Miki et al. |
| 2011/0199985 | A1 | 8/2011 | Cai et al. |
| 2011/0206151 | A1 | 8/2011 | McCloud et al. |
| 2011/0223900 | A1 | 9/2011 | Yu et al. |
| 2011/0235586 | A1 | 9/2011 | Han et al. |
| 2011/0294497 | A1 | 12/2011 | Hedlund et al. |
| 2011/0302390 | A1 | 12/2011 | Copeland et al. |
| 2012/0014242 | A1 | 1/2012 | Kim et al. |
| 2012/0033650 | A1 | 2/2012 | Ahn et al. |
| 2012/0039246 | A1 | 2/2012 | Zhang et al. |
| 2012/0042226 | A1 | 2/2012 | Ramesh et al. |
| 2012/0051271 | A1 | 3/2012 | Beale |
| 2012/0063384 | A1 | 3/2012 | Bi et al. |
| 2012/0093249 | A1 | 4/2012 | Sun et al. |
| 2012/0094651 | A1 | 4/2012 | Chun et al. |
| 2012/0150521 | A1 | 6/2012 | Balkwill |
| 2012/0170524 | A1 | 7/2012 | Ren et al. |
| 2012/0204081 | A1 | 8/2012 | Fresia et al. |
| 2013/0010724 | A1 | 1/2013 | Han et al. |
| 2013/0024753 | A1 | 1/2013 | Masuda et al. |
| 2013/0034062 | A1 | 2/2013 | Seo et al. |
| 2013/0058240 | A1 | 3/2013 | Kim et al. |
| 2013/0058294 | A1 | 3/2013 | Miki et al. |
| 2013/0058306 | A1 | 3/2013 | Noh et al. |
| 2013/0060735 | A1 | 3/2013 | Haddy et al. |
| 2013/0064203 | A1* | 3/2013 | Ogawa ............... 370/329 |
| 2013/0070689 | A1 | 3/2013 | Liu et al. |
| 2013/0070690 | A1 | 3/2013 | Moon et al. |
| 2013/0088973 | A1 | 4/2013 | Yang et al. |
| 2013/0115987 | A1 | 5/2013 | Yoo et al. |
| 2013/0121168 | A1 | 5/2013 | Luo et al. |
| 2013/0121295 | A1 | 5/2013 | Saito et al. |
| 2013/0155867 | A1 | 6/2013 | Asokan et al. |
| 2013/0155872 | A1 | 6/2013 | Subramanian et al. |
| 2013/0155878 | A1 | 6/2013 | Deng et al. |
| 2013/0184023 | A1 | 7/2013 | Asokan et al. |
| 2013/0208600 | A1 | 8/2013 | Campbell et al. |
| 2013/0208603 | A1 | 8/2013 | Choi et al. |
| 2013/0227092 | A1 | 8/2013 | Maestas |
| 2013/0227233 | A1 | 8/2013 | Asokan |
| 2013/0275606 | A1 | 10/2013 | Iyer |
| 2014/0185425 | A1 | 7/2014 | Kim et al. |
| 2015/0043356 | A1* | 2/2015 | Awano et al. ............... 370/242 |

OTHER PUBLICATIONS

"Pushing the Limits of LTE: A Survey on Research Enhancing the Standard"; Schwarz et al.; Digital Object Identifier 10.1109/Access. 2013.2260371; May 2013.*

Non-Final Office Action for U.S. Appl. No. 13/154,166 (Aug. 19, 2013).

Non-Final Office Action for U.S. Appl. No. 13/396,577 (Aug. 8, 2013).

Radio Electronics, "LTE CA: Carrier Aggregation Tutorial," pp. 1-7 http://www.radio-electronics.com/info/cellulartelecomms/lte-long-term-evolution/4g-lte-advanced-carner-channel-aggregation.php (Printed from the Internet Aug. 7 2013).

Share Technote, "Frame Structure—Downlink," pp. 1-11 http://www.sharetechnote.com/html/FrameStructure_DL.html#PCFICH (Printed from the Internet Aug. 7, 2013).

Non-Final Office Action for U.S. Appl. No. 13/336,005 (Jul. 2, 2013).

Non-Final Office Action for U.S. Appl. No. 13/431,975 (May 24, 2013).

3rd Generation Partnership Project, "Technical Specification Group Radio Access Network; Evolved Universal Terrestrial Radio Access (E-UTRA); Physical layer procedures (Release 11)," 3GPP TS 36.213, V11.2.0, pp. 1-173 (Feb. 2013).

3rd Generation Partnership Project, "Technical Specification Group Radio Access Network; Evolved Universal Terrestrial Radio Access (E-UTRA); Multiplexing and channel coding (Release 11)," 3GPP TS 36.212, V11.2.0, pp. 1-18 (Feb. 2013).

3rd Generation Partnership Project, "Technical Specification Group Radio Access Network; Evolved Universal Terrestrial Radio Access (E-UTRA); Physical Channels and Modulation (Release 11)," 3GPP TS 36.211, V11.2.0, pp. 1-109 (Feb. 2013).

3rd Generation Partnership Project, "Technical Specification Group Radio Access Network; Evolved Universal Terrestrial Radio Access (E-UTRA); Physical layer; Measurements (Release 11)," 3GPP TS 36.214, V11.1.0, pp. 1-14 (Dec. 2012).

3rd Generation Partnership Project, "Technical Specification Group Radio Access Network; Evolved Universal Terrestrial Radio Access (E-UTRA); LTE physical layer; General description (Release 11)," 3GPP TS 36.201, V11.1.0 pp. 1-13 (Dec. 2012).

3rd Generation Partnership Project, "Technical Specification Group Radio Access Network; Evolved Universal Terrestrial Radio Access (E-UTRA); Physical layer for relaying operation (Release 11)," 3GPP TS 36.215, V11.0.0, pp. 1-16 (Sep. 2012).

Commonly assigned, co-pending U.S. Appl. No. 13/447,160 for "Methods, Systems, and Computer Readable Media for Heuristics-Based Adaptive Protocol Parsing," (unpublished, filed Apr. 13, 2012).

Commonly assigned, co-pending U.S. Appl. No. 13/431,975 for "Methods, Systems, and Computer Readable Media for Dynamically Controlling a Turbo Decoding Process in a Long Term Evolution (LTE) Multi-User Equipment (UE) Traffic Simulator," (unpublished, filed Mar. 28, 2012).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description: Stage 2 (Release 9)," 3GPP TS 36.300 v9.9.0 (Dec. 2011).

"3rd Generation Partnership Project; Universal Mobile Telecommunications System (UMTS); Evolved Universal Terrestrial Radio Access (E-UTRA); Physical layer for relaying operation (Release 10)," 3GPP TS 36.216, v10.3.1 (Sep. 2011).

"3rd Generation Partnership Project; Technical Specification Group Radio Access Network; Evolved Universal Terrestrial Radio Access (E-UTRA); Physical layer procedures (Release 10)," 3GPP TS 36.213, V10.3.0 (Sep. 2011).

"3rd Generation Partnership Project; Technical Specification Group Radio Access Network; Evolved Universal Terrestrial Radio Access (E-UTRA); Multiplexing and channel coding (Release 10)," 3GPP TS 36.212, V10.3.0 (Sep. 2011).

"3rd Generation Partnership Project; Technical Specification Group Radio Access Network; Evolved Universal Terrestrial Radio Access (E-UTRA); Physical Channels and Modulation (Release 10)," 3GPP TS 36.211, V10.3.0 (Sep. 2011).

"LTE; Evolved Universal Terrestrial Radio Access (E-UTRA); Physical layer; Measurements (3GPP TS 36.214 version 10.1.0 Release 10)," ETSI TS 136 214, V10.1.0 (Apr. 2011).

(56) References Cited

OTHER PUBLICATIONS

Third Generation Partnership Project, "Technical Specification Group Radio Access Network; Evolved Universal Terrestrial Radio Access (E-UTRA); LTE Physical Layer; General Description," 3GPP TS 36.201 v10.0.0, Release 10 (Dec. 2010).
"IxCatapult Chassis," http://www.ixiacom.com/products/display?skey=ch_ixcatapult, pp. 1-2 (Downloaded from the Internet Apr. 14, 2010).
"Wireless Network Testing," Ixia, 915-2623-01 Rev A, pp. 1-18 (Jan. 2010).
"Wireless Network Testing," Ixia, 915-2622-01 Rev A, pp. 1-16 (Jan. 2010).
Xiao et al., "IMS Network Deployment Cost Optimization Based on Flow-Based Traffic Model," IEEE/IFIP Network Operations and Management Symposium—NOMS 2010, pp. 232-239 (2010).
"3rd Generation Partnership Project; Technical Specification Group Radio Access Network; Requirements for Evolved UTRA (E-UTRA) and Evolved UTRAN (E-UTRAN) (Release 9)," 3GPP TR 25.913, v9.0.0 (Dec. 2009).
"PDCCH Blind Decoding," PDCCH Decoding Example, http://www.steepestascent.com, pp. 1-6 (Copyright 2009-2011, dowloaded from the Internet Dec. 4, 2011).
"Network Topology," http://web.archive.org/web/20081219235147/http://en.wikipedia.org/wiki/Network_topology, pp. 1-9 (Dec. 19, 2008).
Notice of Allowance and Fee(s) Due for U.S. Appl. No. 13/431,975 (Jan. 22, 2014).
Notice of Allowance and Fee(s) Due for U.S. Appl. No. 13/396,577 (Dec. 18, 2013).
Non-Final Office Action for U.S. Appl. No. 13/447,160 (Nov. 8, 2013).
Non-Final Office Action for U.S. Appl. No. 13/431,975 (Oct. 10, 2013).
Non-Final Office Action for U.S. Appl. No. 13/326,264 (Oct. 10, 2013).
Notice of Allowance and Fee(s) Due for U.S. Appl. No. 13/408,787 (Jul. 18, 2014).
Non-Final Office Action for U.S. Appl. No. 13/447,160 (Jul. 10, 2014).
Notice of Allowance and Fee(s) Due for U.S. Appl. No. 13/326,264 (Jun. 9, 2014).
Notice of Allowance and Fee(s) Due for U.S. Appl. No. 13/154,166 (Jun. 2, 2014).
Advisory Action for U.S. Appl. No. 13/447,160 (May 29, 2014).
Applicant-Initiated Interview Summary for U.S. Appl. No. 13/447,160 (May 23, 2014).
Applicant-Initiated Interview Summary for U.S. Appl. No. 13/154,166 (Apr. 28, 2014).
Non-Final Office Action for U.S. Appl. No. 13/429,384 (Apr. 9, 2014).
Final Office Action for U.S. Appl. No. 13/447,160 (Mar. 18, 2014).
Final Office Action for U.S. Appl. No. 13/154,166 (Mar. 3, 2014).
Final Office Action for U.S. Appl. No. 13/336,005 (Feb. 26, 2014).
Interview Summary for U.S. Appl. No. 13/447,160 (Feb. 25, 2014).
Final Office Action for U.S. Appl. No. 13/326,264 (Feb. 20, 2014).
Non-Final Office Action for U.S. Appl. No. 13/408,787 (Feb. 3, 2014).
Notification of Transmittal of the International Search Report and the Written Opinion of the International Searching Authority, or the Declaration for International Application No. PCT/US2012/070877 (Mar. 28, 2013).
3rd Generation Partnership Project, "Technical Specification Group Radio Access Network; Evolved Universal Terrestrial Radio Access (E-UTRA); Physical layer for relaying operation (Release 11)," 3GPP TS 36.216, V11.0.0, pp. 1-16 (Sep. 2012).
Ikuno et al., "System level simulation of LTE networks," 2010 IEEE 71st Vehicular Technology Conference: VTC2010-Spring, (May 16-19, 2010).
Abbes et al., "Protocol Analysis in Intrusion Detection Using Decision Tree," IEEE, Proceedings of the International Conference on Information Technology: Coding and Computing (ITCC'04), pp. 1-5 (2004).
Sleator et al., "Self-Adjusting Binary Search Trees," Journal of the Association for Computing Machinery. vol. 32, No. 3, pp. 652-686 (Jul. 1985).
Notice of Allowance and Fee(s) Due for U.S. Appl. No. 13/429,384 (Jun. 10, 2015).
Notice of Allowance and Fee(s) Due for U.S. Appl. No. 13/447,160 (Apr. 30, 2015).
Corrected Notice of Allowability for U.S. Appl. No. 13/154,166 (Apr. 24, 2015).
Notice of Allowance and Fee(s) Due for U.S. Appl. No. 13/154,166 (Apr. 13, 2015).
Applicant-Initiated Interview Summary for U.S. Appl. No. 13/447,160 (Mar. 26, 2015).
Advisory Action Before the Filing of an Appeal Brief for U.S. Appl. No. 13/447,160 (Mar. 5, 2015).
Advisory Action, Examiner-Initiated Interview Summary and AFCP 2.0 Decision for U.S. Appl. No. 13/429,384 (Mar. 3, 2015).
Notice of Allowance and Interview Summary for U.S. Appl. No. 13/352,058 (Feb. 5, 2015).
Final Office Action for U.S. Appl. No. 13/447,160 (Dec. 19, 2014).
Non-Final Office Action and Examiner-Imitated Interview Summary for U.S. Appl. No. 13/336,005 (Dec. 4, 2014).
Final Office Action for U.S. Appl. No. 13/429,384 (Nov. 21, 2014).
Non-Final Office Action for U.S. Appl. No. 13/154,166 (Oct. 28, 2014).
Notice of Publication for GB Patent Application No. 1411056.3 (Aug. 11, 2014).
Notice of Allowance and Fee(s) Due for U.S. Appl. No. 13/371,389 (Aug. 8, 2014).
Non-Final Office Action for U.S. Appl. No. 13/352,058 (Aug. 4, 2014).
Dahlman et al., "10.4.6: Carrier Aggregation and Cross-Carrier Scheduling," 4G LTE / LTE-Advanced for Mobile Broadband, pp. 193-194 (2011).
Dahlman et al., "10.4.9: Blind Decoding of PDCCHs," 4G LTE / LTE-Advanced for Mobile Broadband, pp. 199-202 (2011).
"DCT2000 LTE UE Simulation API Manual," Release 17.1, Catapult Communications, pp. 1-106 (May 2009).
"Catapult Communications Announces High-Capacity LTE UE Simulation Test System," Catapult Communications Corporation, pp. 1-2 (Feb. 9, 2009).
Dutta et al., "A Tight Lower Bound for Parity in Noisy Communications Networks," Tata Institute of Fundamental Research, pp. 1056-1065 (2008).
"LTE (Long Term Evolution) Testing Systems," http://www.catapult.com/technologies/tech_lte.htm, pp. 1-2 (Jun. 26, 2008).
Nilsson et al., "The Scalable Tree Protocol—A Cache Coherence Approach for Large-Scale Multiprocessors," IEEE, pp. 498-506 (1992).

* cited by examiner

METHODS, SYSTEMS, AND COMPUTER READABLE MEDIA FOR UTILIZING ADAPTIVE SYMBOL PROCESSING IN A MULTIPLE USER EQUIPMENT (MULTI-UE) SIMULATOR

TECHNICAL FIELD

The subject matter described herein relates to simulating user equipment (UE) devices using testing telecommunications network equipment. More particularly, the subject matter described herein relates to methods, systems, and computer readable media for utilizing adaptive symbol processing in a multiple user equipment (multi-UE) simulator.

BACKGROUND

Mobile communications networks are moving to the long term evolution (LTE) standards defined by the Third Generation Partnership Project (3GPP). The LTE physical layer, which provides physical layer communications between user equipment (UE), such as mobile handsets, and evolved node Bs (eNodeBs) is defined in 3GPP TS 36.201 and TS 36.211-216. The LTE physical layer provides modulation, physical channels, channel coding, and other aspects of physical layer communications between a UE and an eNodeB.

Before LTE network equipment, such as an eNodeB, can be placed into service, the equipment must be tested under operational or simulated operational conditions. For example, in operation, an eNodeB is required to handle simultaneous communications from multiple UEs. Accordingly, it is desirable for LTE test equipment to simulate multiple UE devices, while satisfying the timing requirements of the above-referenced LTE physical layer standards. LTE signal processing in LTE test equipment typically involves, at a high level, the receiving of an LTE signal from a single carrier by one or more antennas at the multi-UE simulator. The LTE signal is then forwarded to a symbol processing module (e.g., a field programmable gate array) for processing. The processed LTE signal is then sent to a resource de-mapping engine prior to being directed to one or more channel processors.

Although the above signal processing methodology functions correctly for current LTE communication systems utilizing a single carrier, this technique may be incompatible with future communication systems (e.g., LTE-Advanced) that utilize multiple-carrier technology, such as carrier aggregation. As used herein, carrier aggregation refers to using multiple different signal carriers in the same or separate frequency bands to increase the transmission bandwidth for a single downlink signal. To accommodate the reception of multiple carriers, the UE must also be equipped with additional antennas. However, as the number of carriers and the number of antennas to be utilized increase, the real-time processing resource demands attain a level where the typical single downlink signal chain (e.g., a receive signal chain) implementation is incapable of performing the necessary signal processing within the allotted processing time window. For example, the time constraints placed on the symbol processing portion of the downlink signal chain create a bottleneck in the overall process. Specifically, symbol processing includes a number of processing task modules, each of which is allocated a limited amount of time (e.g., 1 Symbol Time that is equal to $1/14$ milliseconds) to complete its designated processing task. Although such allocated time is sufficient to process an LTE signal from a single carrier, the symbol processing module has difficulty or is incapable of processing an LTE signal received via multiple carriers (e.g., carrier aggregation) using the current downlink signal chain methodology for processing a signal received on a single carrier.

Accordingly, in light of these difficulties, there exist a need for methods, systems, and computer readable media for utilizing adaptive symbol processing in a multi-UE simulator.

SUMMARY

The subject matter described herein includes methods, systems, and computer readable media for utilizing adaptive symbol processing in a multiple user equipment (multi-UE) simulator. According to one aspect, a method includes receiving a downlink signal including a plurality of downlink signal portions, wherein each of the downlink signal portions is received via one of a plurality of carriers. The method further includes forwarding the downlink signal portions to a first downlink signal chain processing module belonging to a plurality of downlink signal chain processing modules, wherein symbol processing task modules associated with the plurality of downlink signal chain processing modules are grouped in logical task pools of similar symbol processing task modules. The method also includes processing the downlink signal portions using the symbol processing task modules associated with the first downlink signal chain processing module, and in the event the processing capabilities of a first symbol processing task module in the first downlink signal chain processing module is exceeded, selecting a similar symbol processing task module from the logical task pool associated with the first symbol processing task module to assist with the processing of the downlink signal portions.

In an alternate embodiment, a method for utilizing adaptive symbol processing in a multi-UE simulator includes receiving a downlink signal including a plurality of downlink signal portions, wherein each of the downlink signal portions is received via one of a plurality of carriers. The method further includes assigning the plurality of carriers among a plurality of downlink signal chain processing modules included in the multi-UE simulator, wherein each downlink signal chain processing module includes a symbol processor; and forwarding, at each downlink signal chain processing module, the downlink signal portions from the assigned carriers to the symbol processing module to be processed.

The subject matter described herein may be implemented in hardware, software, firmware, or any combination thereof. As such, the terms "function", "node" or "module" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
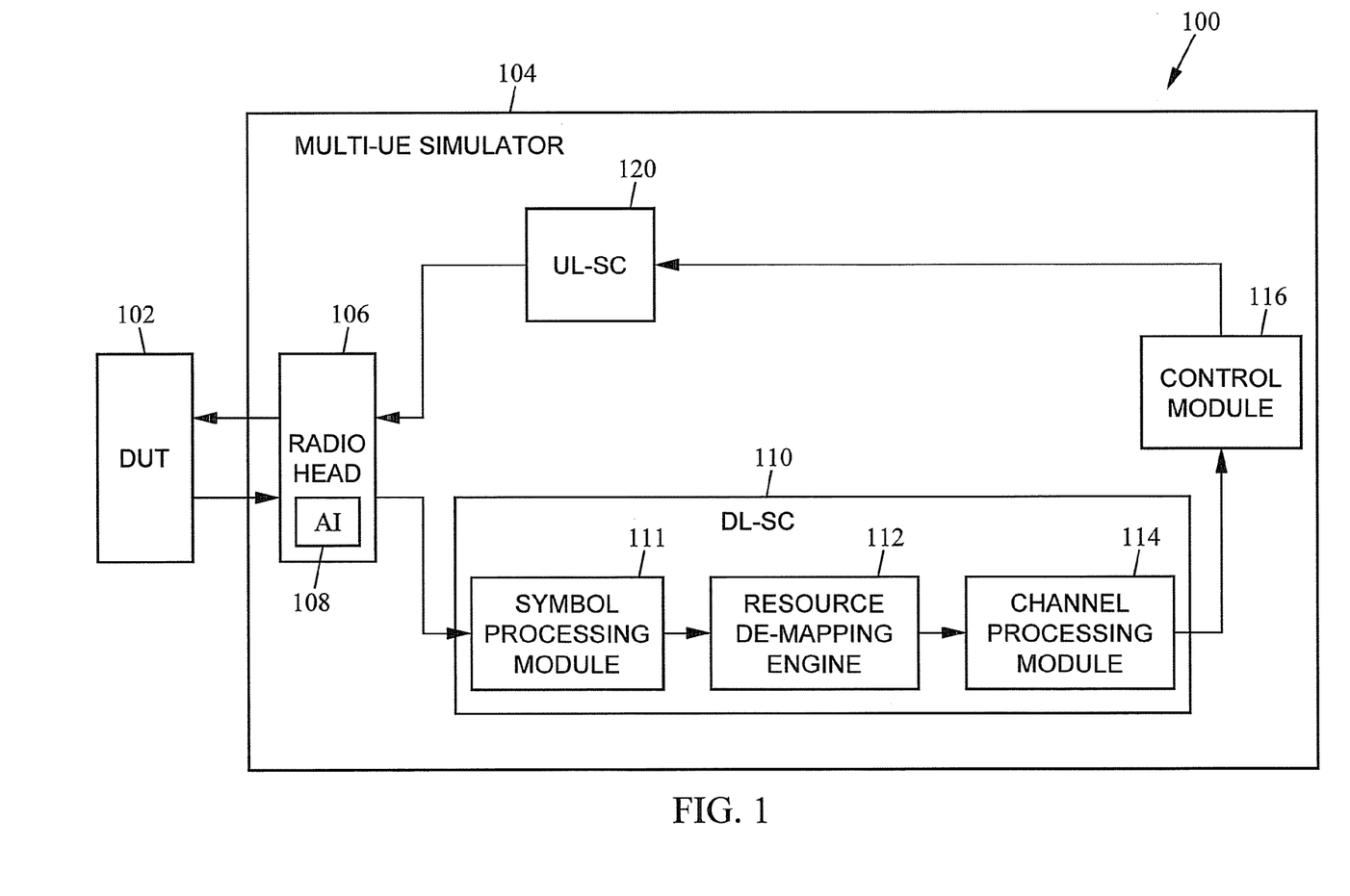
FIG. 1 is a block diagram illustrating details of an exemplary multiple user equipment simulation system according to an embodiment of the subject matter described herein.

Methods, systems, and computer readable media for utilizing adaptive symbol processing in multiple user equipment (multi-UE) simulator are disclosed. FIG. 1 is a block diagram illustrating an exemplary overall architecture for a multi-UE simulation system 100 according to an embodiment of the subject matter described herein. Referring to FIG. 1, system 100 includes a multi-UE simulator 104 that is communicatively connected to a device under test (DUT) 102. In some embodiments, simulator 104 may include a radio head 106 equipped with a plurality a plurality of antenna interfaces 108 that transmit signals to and from DUT 102. In one embodiment, the antenna interfaces 108 may be actual radio interfaces capable of transmitting data to and receiving data from DUT 102 over wireless links. Alternatively, the antenna interfaces 108 may be wired interfaces, such as common public radio interface (CPRI) interfaces that transmit data to and receive data from DUT 102 over wired links that are intended to simulate wireless links. Device under test 102 may be any suitable radio network element, such as an evolved node B (eNodeB).

In some embodiments, radio head 106 may also be configured to send data in the downlink direction to a downlink signal chain (DL-SC) processing module 110 for further processing. In LTE networks, the downlink direction refers to a signal transmission from the eNodeB (or other DUT) to the UE, and the uplink direction refers to transmission from the UE to the eNodeB. Similarly, radio head 106 may receive data in the uplink direction from uplink signal chain (UL-SC) processing module 120. Radio head 106 may be located on or external to multi-UE simulator 104. Although FIG. 1 only depicts a single DL-SC processing module 110 and a single UL-SC processing module 120, any number of DL-SC processing modules and UL-SC processing modules can be utilized in multi-UE simulator 104 without departing from the scope of the present subject matter.

As mentioned above, simulator 100 may also include one or more DL-SC processing modules 110 that perform symbol processing functions on a multi-carrier downlink signal. For example, portions of a downlink signal received via different carriers may be assigned and/or distributed among a plurality of DL-SC processing modules 110. As used herein, the term carrier includes a radio frequency (RF) carrier. In one embodiment, the multi-UE simulator 104 may include a module or component (e.g., radio head 106) that is responsible for assigning the carriers among the DL-SC processing modules 110. In some embodiments, DL-SC processing module 110 and the UL-SC processing module 120 each includes a field programmable gate array (FPGA) or a digital signal processor (DSP). Additional components of multi-UE simulator 104 include turbo decoders for decoding downlink data and control DSPs for processing downlink control information, but are not illustrated in FIG. 1 since these components are not necessary to illustrate the functionality of the subject matter described herein.

In one embodiment, DL-SC processing module 110 may perform decision directed routing and processing of the received downlink data (e.g., an LTE signal). For example, decision directed routing includes identifying and sending some radio link control/medium access control (RLC/MAC) data to a control module 116 (e.g., an RLC/MAC layer module). In one embodiment, DL-SC processing module 110 includes a symbol processing module 111, a resource de-mapping engine 112, and channel processing module 114. Symbol processing module 111 may be configured to receive one or more downlink signal portions (e.g., symbols, IQ signal samples, etc.) and conduct various signal processing tasks as discussed below with respect to FIG. 2. Resource de-mapping engine 112 and channel processing module 114 respectively perform de-mapping and channel processing tasks within the DL-SC processing module 110. The processed downlink signal portions are subsequently provided to control module 116.

On the uplink side, uplink signal chain (UL-SC) processing module 120 receives uplink data from control module 116. Control module 116 may be configured to provide a resource mapping (e.g., frequencies, modulation, etc.) to uplink signal chain processing module 120, which uses the mappings to formulate an uplink modulated signal using transport block data received from control module 116. UL-SC processing module 120 sends the uplink modulated signal (e.g., transport blocks) to radio head 102 for transmission to DUT 102. Alternatively, as set forth above, radio head 102 can be configured (or omitted) to send uplink data DUT 102 over a wired connection.

Figure 2:
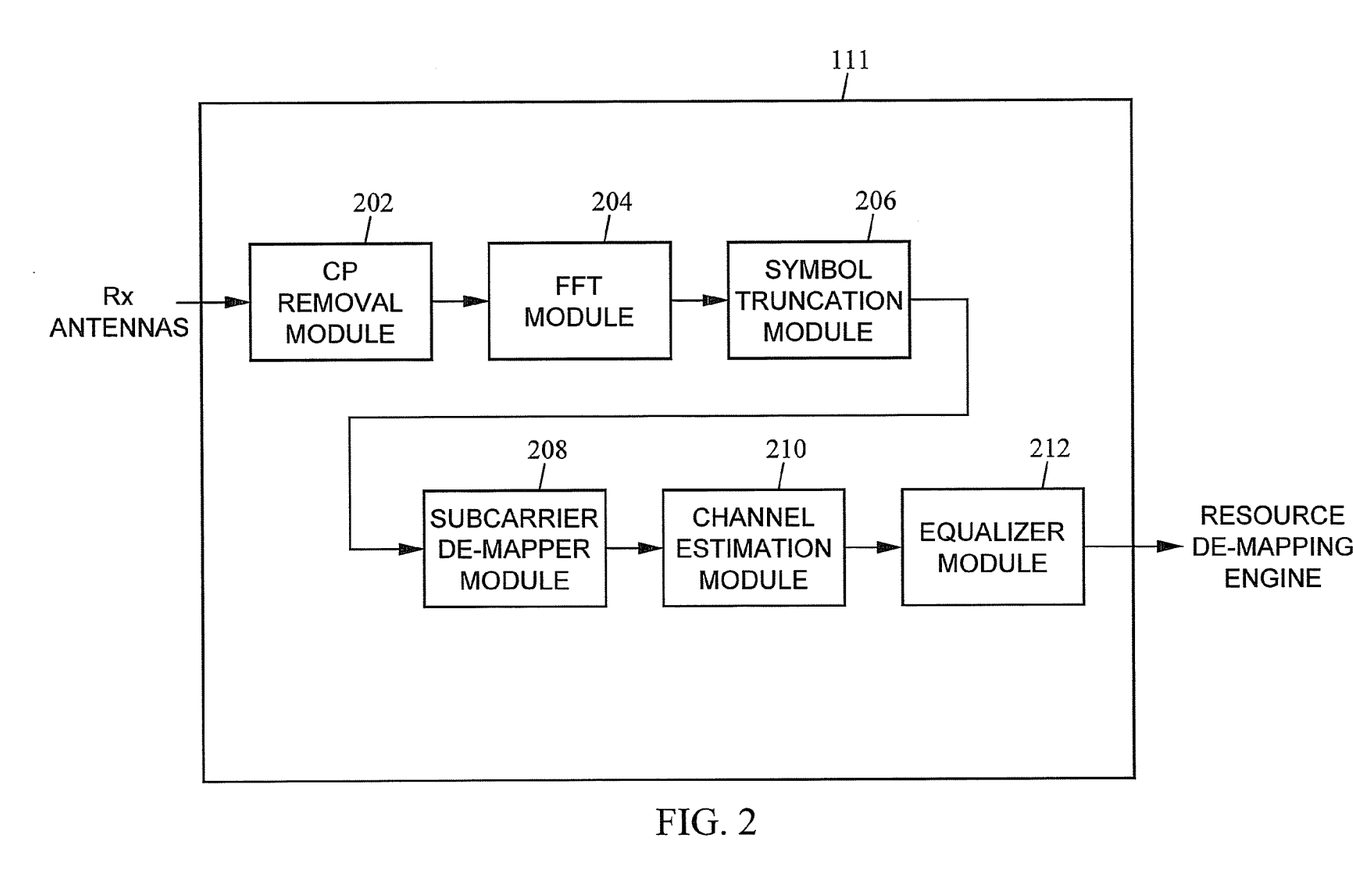
FIG. 2 is a block diagram illustrating details of an exemplary symbol processing module according to an embodiment of the subject matter described herein.

FIG. 2 is a block diagram illustrating details of an exemplary symbol processing module according to an embodiment of the subject matter described herein. Referring to FIG. 2, symbol processing module 111 is associated with a DL-SC and performs symbol processing in a hierarchical manner. In one embodiment, symbol processing module 111 may receive a single downlink signal (e.g., LTE signal) over a plurality of carriers at one or more receiving antenna interfaces (e.g., antenna interfaces 108 in FIG. 1). For example, each carrier may be utilized to transport a portion of the downlink signal. After being received at the antenna interfaces and forwarded to symbol processing module 111, the downlink signal portions are processed by to a cyclic prefix (CP) removal module 202 which is configured to remove cyclic prefixes from an OFDM symbol of the received downlink signal. In one embodiment, each of the downlink signal portions may include an in-phase and quadrature (IQ) signal sample. Afterwards, an FFT module 204 may perform fast Fourier transform (FFT) processing of the downlink signal portions to produce individual frequency components. A symbol truncation module 206 performs truncation on the frequency component samples to reduce the bit resolution. A subcarrier de-mapper module 208 performs de-mapping of the resource elements from the frequency components. A channel estimation and equalization module 210 may perform channel estimation and equalization on the downlink signal portions. In some embodiments, each of task modules 202-212 is allocated the same amount of time (e.g., one symbol time (ST) equal to $1/14$ milliseconds) to perform its respective processing task.

Figure 3:
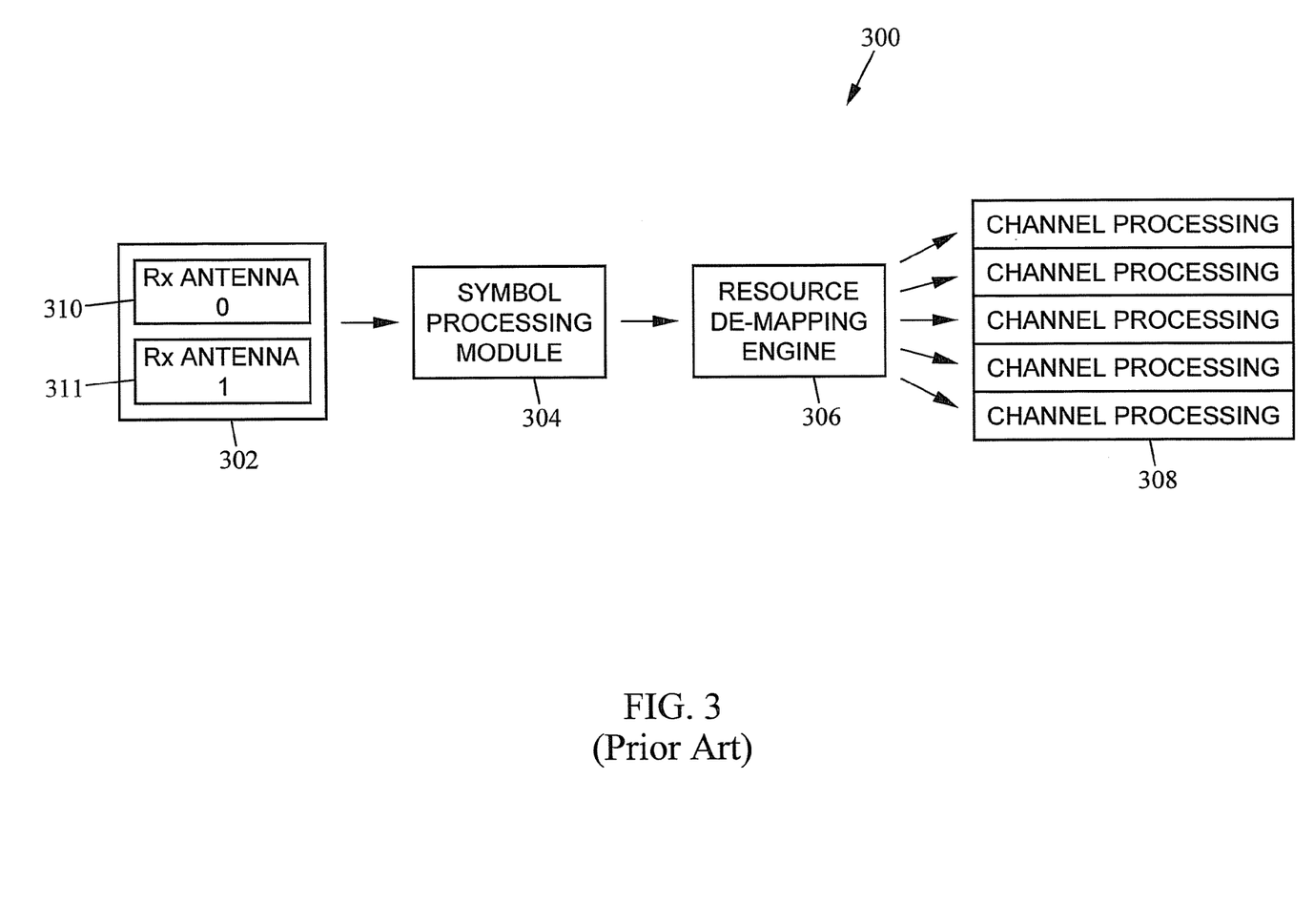
FIG. 3 is a is a block diagram illustrating details of an exemplary architecture of single downlink signal chain.

FIG. 3 is a block diagram illustrating an exemplary architecture of single downlink signal chain processing module. Referring to FIG. 3, a radio head 302 including antenna interfaces 310 and 311 receive portions of a downlink signal (e.g., an LTE signal) transported via a single carrier from a device under test (not shown). In one embodiment, the downlink signal portions are provided to symbol processing module 304. After processing the downlink signal portions using symbol processing task modules (e.g., see task modules 202-212 in FIG. 2), the processed downlink signal portions are forwarded to resource de-mapping engine 306 and channel processing modules 308 for additional signal processing. While this single downlink signal chain processing module is adequate for communications systems that utilize a single carrier, some communications systems (such as LTE-Advanced) are configured to utilize multiple carrier technologies, such as carrier aggregation which may create processing problems for DL-SC processing module 300. In particular, the time constraints/allocations assigned to the symbol processing module 304 of DL-SC processing module 300 may become a bottleneck for the processing of a received downlink signal and/or signal portions.

Figure 4:
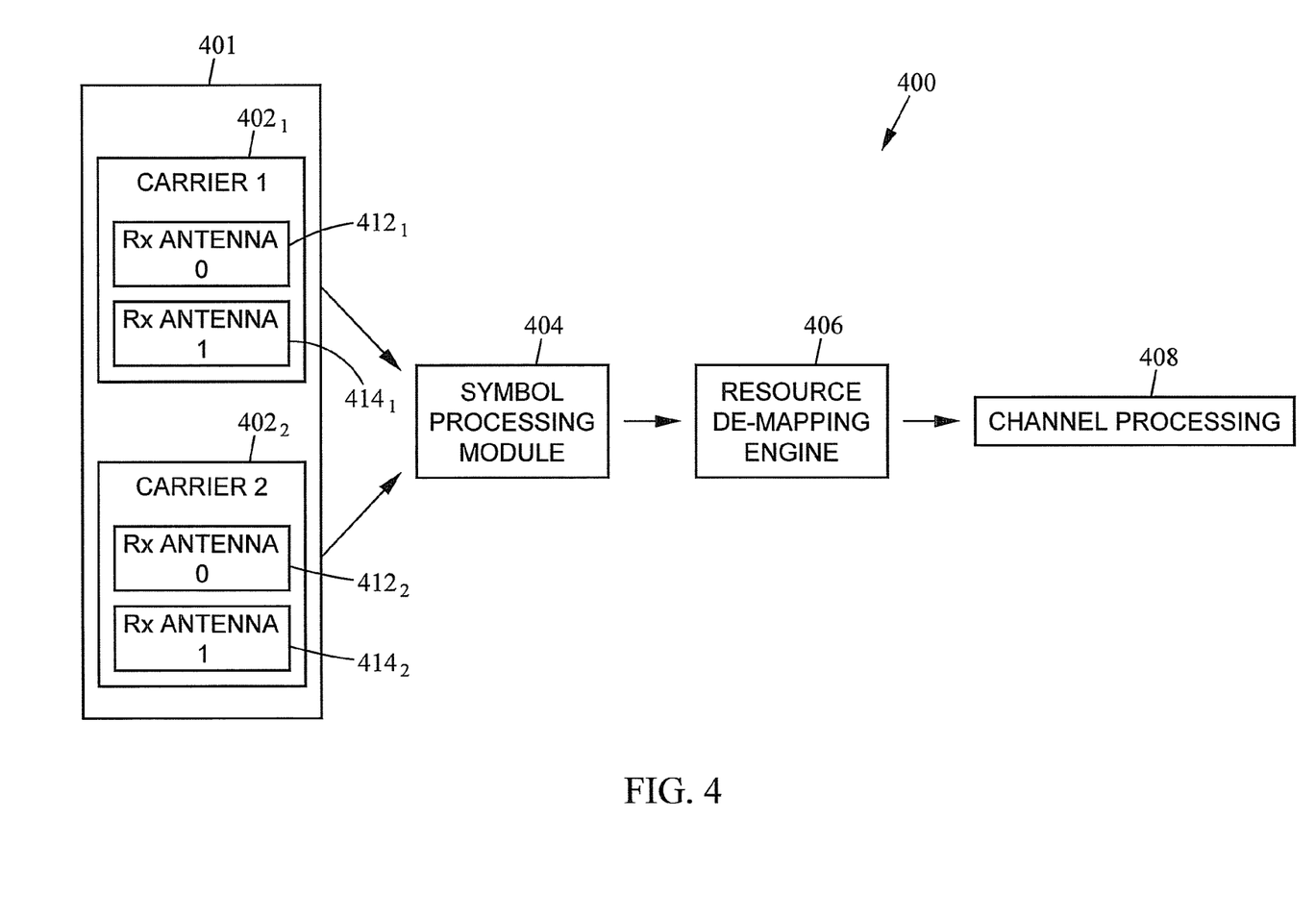
FIG. 4 is a block diagram illustrating details of a single downlink signal chain processing module configured to process a downlink signal portions from multiple carriers according to an embodiment of the subject matter described herein.

FIG. 4 is a block diagram illustrating a single downlink signal chain processing module configured to process a downlink signal portions from multiple carriers according to an embodiment of the subject matter described herein. In FIG. 4, a radio head 401 includes a plurality of antenna interfaces 402 configured to receive downlink signals (e.g., an LTE signal) from a plurality of carriers. For example, antenna interface $402_1$ includes antenna $412_1$ and antenna $414_1$ which may be used to receive portions of a downlink signal from a first RF carrier or channel. Similarly, antenna interface $402_2$ includes antenna $412_2$ and antenna $414_2$ which may be used receive portions of a downlink signal (e.g. LTE signal) via a second RF carrier or channel. Although only two antenna interfaces are depicted in FIG. 4, additional antenna interfaces associated with additional carriers may be utilized without departing from the scope of the present subject matter.

In some embodiments, each of the symbol processing task modules 202-212 depicted in FIG. 2 is allocated with a fixed amount of time (i.e., $1/14$ millisecond) to conduct their respective function. However, some functional symbol processing tasks are computationally less, expensive than other tasks and therefore require less time to complete than the allocated time. In one embodiment, CP removal module 202 may only require 20% of the allocated time (e.g., $1/5$ of $1/14$ milliseconds) but FFT module 204 may require 50% of the allocated time. Because each function task associated with symbol processing module 404 is capable of performing its processing in less time than the allocated $1/14$ milliseconds, one possible solution to the problems presented by carrier aggregation involves the time division multiplexing (TDM) of multiple carriers. Specifically, the downlink signal portions from each of the plurality of carriers may be multiplexed through symbol processing module 404 via TDM. However, this serial processing approach may be limited in the number of carriers that can be handled and/or processed in real-time.

Specifically, there may be sufficient unused time with respect to each of the functional tasks (i.e., the symbol processing task modules) that the downlink signal portion from a first carrier (e.g., carrier 1) and the downlink signal portion from a second carrier (e.g., carrier 2) can be multiplexed (via TDM) through the symbol processing downlink signal chain processing module. However, in this example, it should be noted that FFT module 204 is capable of only handling two carrier signals during its $1/14$ millisecond time allocation. Thus, if a third carrier was added/multiplexed through the downlink signal chain processing module, the FFT function task would not be able to handle the load. To address this aspect, the use of multiple TDM downlink signal chain processing modules operating in parallel may be utilized as addressed below.

Figure 5:
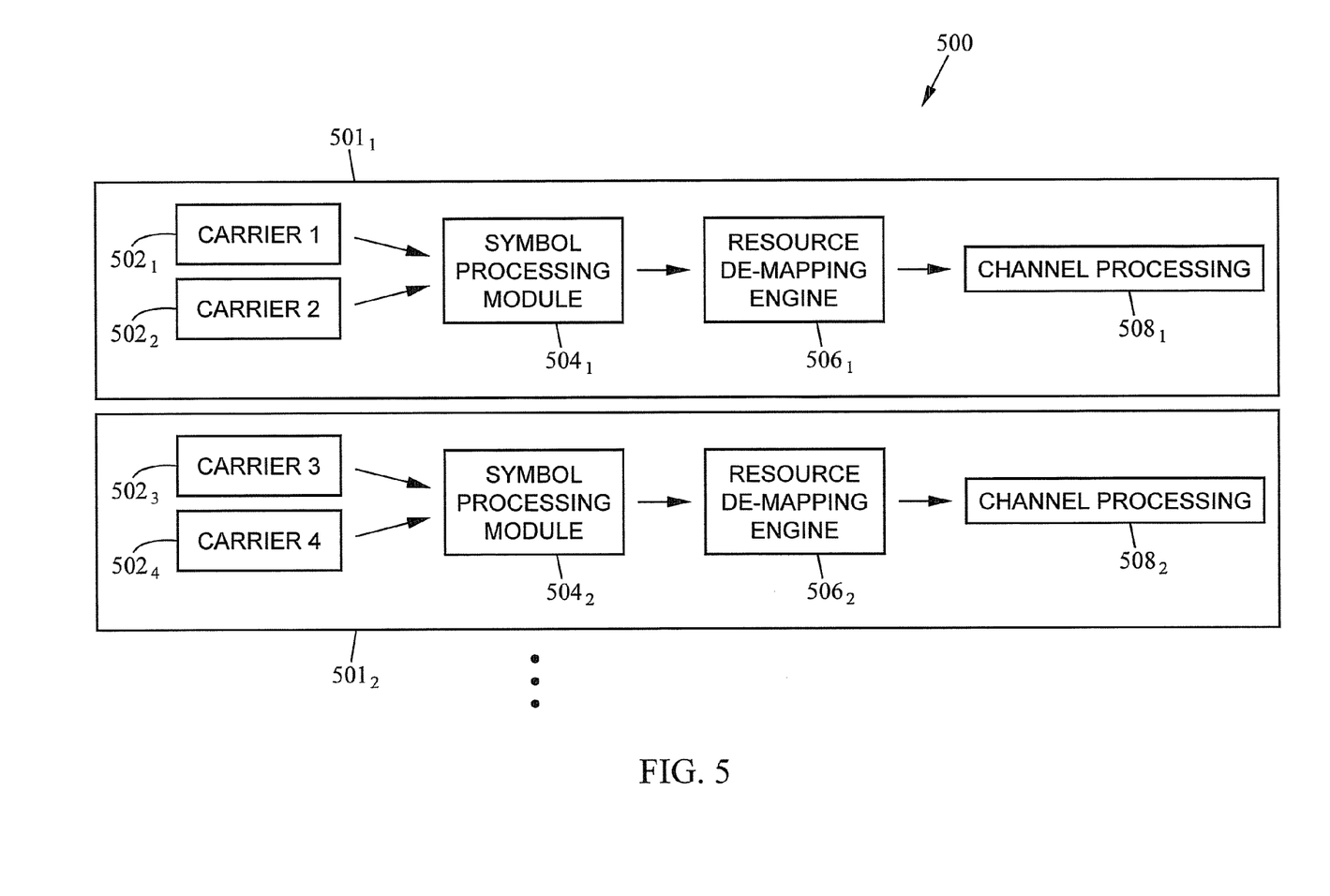
FIG. 5 is a block diagram illustrating the utilization of a plurality of downlink signal chain processing modules configured to process downlink signal portions in parallel according to an embodiment of the subject matter described herein.

FIG. 5 is a block diagram illustrating the utilization of a plurality of downlink signal chain processing modules configured to process downlink signal portions in parallel according to an embodiment of the subject matter described herein. Referring to FIG. 5, an architecture that includes a first downlink signal chain processing module $501_1$ and a second downlink signal chain processing module $501_2$ operating in parallel is illustrated. Notably, each downlink signal chain processing module depicted in FIG. 5 includes at least one carrier. Like the exemplary downlink signal chain processing module depicted in FIG. 4, each of downlink signal chain processing modules $501_1$ and $501_2$ may be limited to process one or two carriers since an FFT module may only be capable of processing two downlink signal portions during its $1/14$ millisecond time allocation. Although only two downlink signal chain processing modules are depicted in FIG. 5, additional downlink signal chain processing modules may be utilized in parallel without departing from the scope of the present subject matter.

Figure 6:
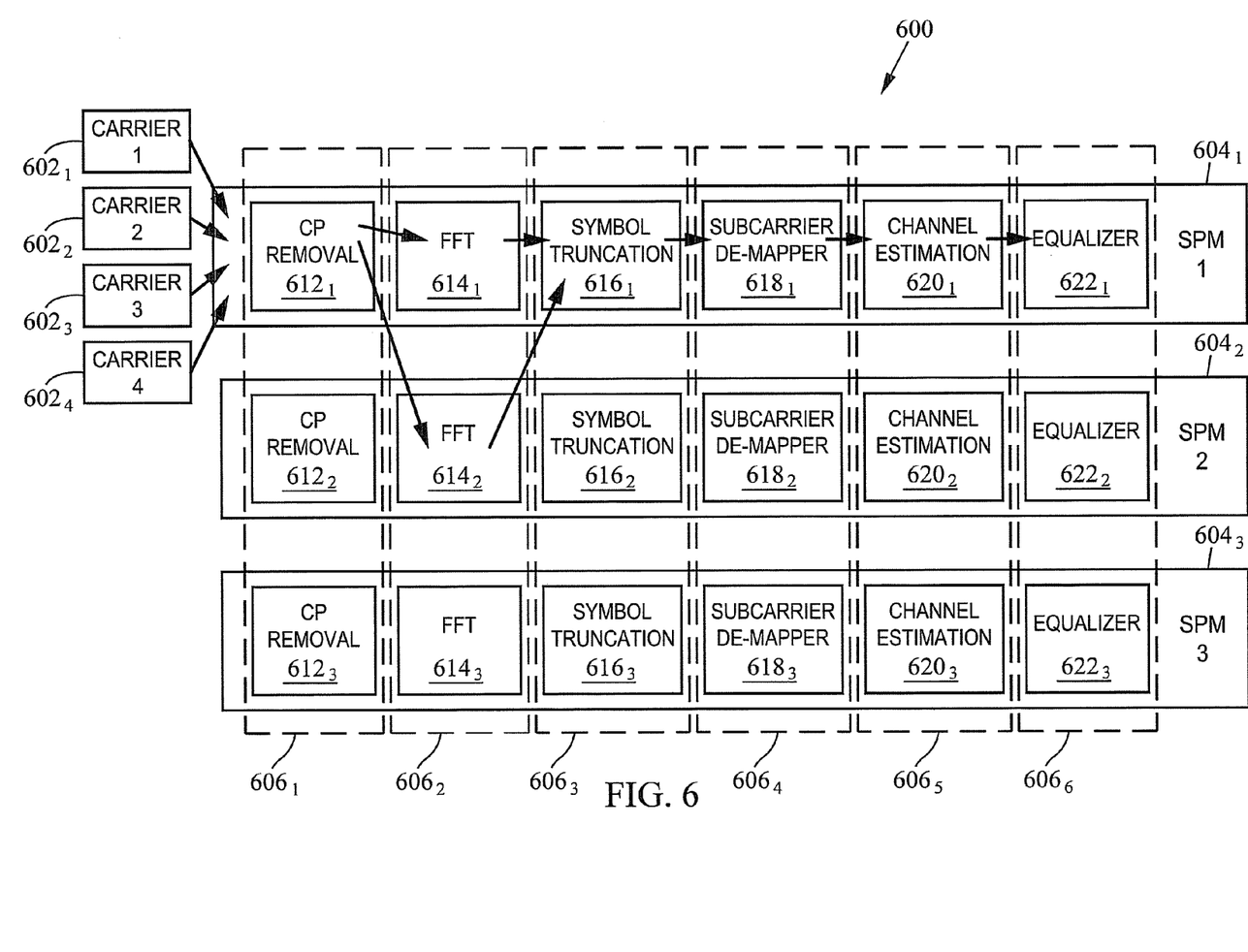
FIG. 6 is a block diagram illustrating the utilization of symbol processing task pools to process a downlink signal according to an embodiment of the subject matter described herein.

FIG. 6 is a block diagram illustrating the use of symbol processing function task pooling optimization according to an embodiment of the subject matter described herein. Referring to FIG. 6, a plurality of symbol processing modules $604_{1...3}$ may be used to process a downlink signal received via a plurality of carriers $602_{1...4}$. Although only three symbol processing modules are depicted in FIG. 6, additional symbol processors may be utilized without departing from the scope of the subject matter. Each of symbol processing modules $604_{1...3}$ includes a CP removal module 612, an FFT module 614, a symbol truncation module 616, a subcarrier de-mapper module 618, a channel estimation module 620, and an equalizer module 622. Notably, similar symbol processing task modules (e.g., task modules configured to perform similar signal processing tasks) are grouped or categorized into logical task pools $606_{1...6}$. For example, CP removal modules $612_{1...3}$ are logically categorized in a CP removal task pool $606_1$ and FFT modules $614_{1...3}$ are logically categorized in a FFT task pool $606_2$. Similarly, symbol truncation modules $616_{1...3}$, subcarrier de-mapper modules $618_{1...3}$, channel estimation modules $620_{1...3}$, and equalizer modules $622_{1...3}$ are respectively categorized into logical task pools $606_3$, $606_4$, $606_5$, and $606_6$.

Referring to FIG. 6, a plurality of downlink signal portions communicated over carriers $602_{1...4}$ is received and forwarded to a first symbol processing module $604_1$. For example, all of the downlink signal portions are initially forwarded to CP removal module $612_1$ and processed in a serial manner using TDM. In this particular example, CP removal module $612_1$ is able to process all four downlink signal portions within its allocated time interval (e.g., $1/14$ millisecond). After the four downlink signal portions are processed, downlink signal chain processing module 600 forwards downlink signal portions associated with two carriers (e.g., carriers $602_1$ and $602_2$) to FFT module $614_1$ and downlink signal portions associated with two carriers (e.g., carriers $602_3$ and $602_4$) to FFT module $614_2$. In one embodiment, the multi-UE simulator hosting the symbol processing modules $604_{1...3}$ determines that FFT module $614_1$ is incapable of processing all four downlink signal portions within the allotted time period. In an alternate embodiment, this determination is made prior to the test simulation process (as opposed to while the simulation is being conducted). Accordingly, the multi-UE simulator may include a selection module configured to select a similar task processing module (i.e., a second FFT module $614_2$) from logical task pool $606_2$ to assist with the processing of the downlink signal portions.

After the FFT processing is conducted by both FFT module $614_1$ and FFT module $614_2$, the downlink signal portions are forwarded to symbol truncation module $616_1$. In the example shown in FIG. 6, it may be determined that only a single symbol truncation module is needed to process the four downlink signal portions within the allocated time. If such a determination is made (e.g., before or during the test simulation), then only a single symbol truncation module $616_1$ is utilized. Similarly, it may be determined that only one subcarrier de-mapper module $618_1$, one channel estimation module $620_1$, and one equalizer module $622_1$ are needed to process the downlink signal portions via TDM in the example depicted in FIG. 6. For example, it may be determined (e.g., before or during the test simulation) that each of subcarrier de-mapper module $618_1$, one channel estimation module $620_1$, and one equalizer module $622_1$ is able to process the four downlink signal portions within the time allocated to each task module (e.g., 1/14 milliseconds).

Notably, only the minimum number of symbol processing task modules required to process the downlink signal portions is utilized. In the event the original processing task module is incapable of processing a downlink signal delivered via a plurality of carriers, the multi-UE simulator may be configured to select one or more similar symbol processing task modules from a logical task pool. Specifically, the optimized adaptive approach depicted in FIG. 6 allows for an efficient use of hardware and downlink signal chain resources within a multi-UE simulator.

Figure 7:
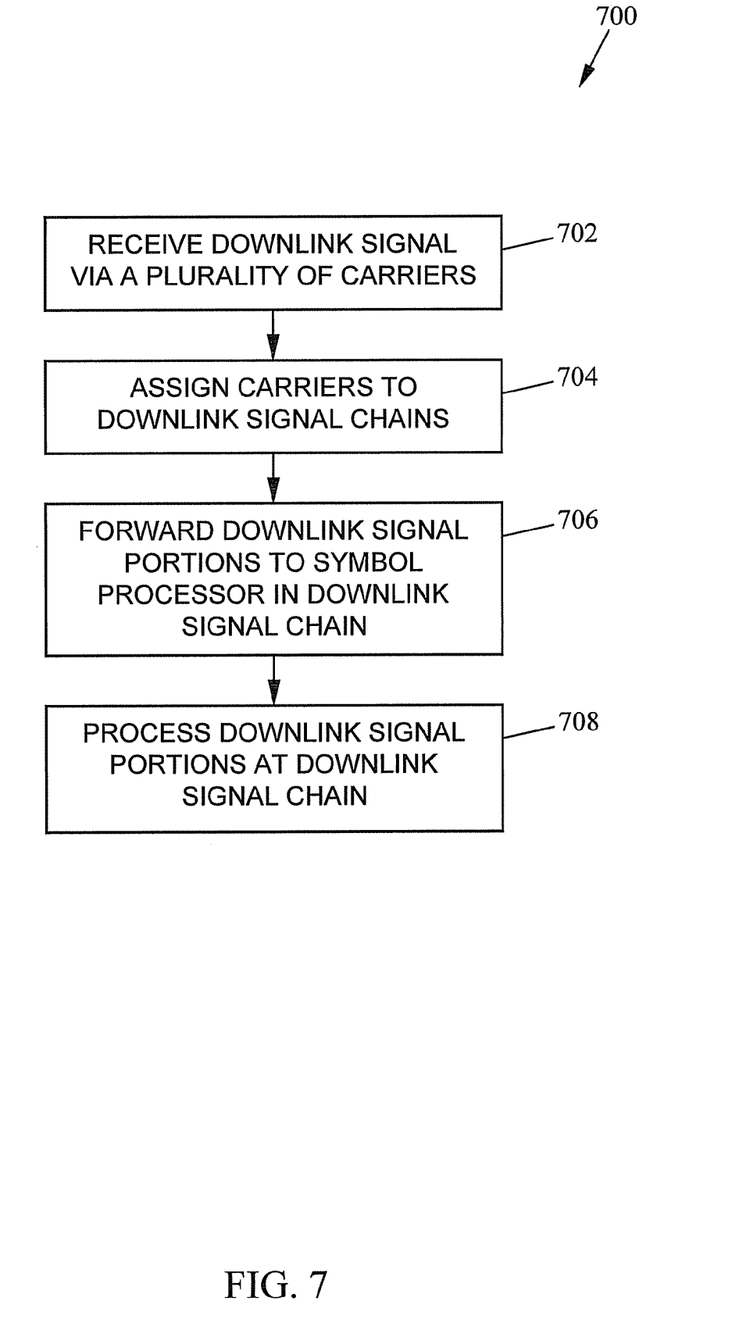
FIG. 7 is a flow chart illustrating exemplary overall steps for conducting symbol processing in a multiple user equipment simulator according to an embodiment of the subject matter described herein.

FIG. 7 is a flow chart illustrating exemplary overall steps of a method 700 for conducting symbol processing in a multi-UE simulator according to an embodiment of the subject matter described herein. In step 702, a downlink signal is received via a plurality of carriers. In one embodiment, a plurality of antenna interfaces at a multi-UE simulator respectively receives a downlink signal (e.g., an LTE signal) that is carried via a plurality of carriers. Specifically, each carrier includes a downlink signal portion of the downlink signal.

In step 704, the carriers are assigned to downlink signal chain processing modules. In one embodiment, each of the carriers and associated downlink signal portions are assigned to one of a plurality of DL-SC processing modules in the multi-UE simulator. The assignment of the carriers to the DL-SC processing modules may be based on the signal processing capabilities/capacity of the symbol processing module (and associated task processing modules) included in the DL-SC processing module.

In step 706, the downlink signal portions are forwarded to the symbol processor in the downlink signal chain processing module. In one embodiment, each of the downlink signal portions are forwarded to a DL-SC processing module to which the associated carrier has been assigned.

In step 708, the downlink signal portions are processed at their respective downlink signal chain processing module. In one embodiment, the symbol processing module in each DL-SC processing module processes the assigned downlink signal portions. If more than one downlink signal portion is assigned to a DL-SC processing module, then the downlink signal portions are processed in a serial manner using TDM. Furthermore, in some embodiments, all of the DL-SC processing modules may be configured to process the downlink signal portions contemporaneously or simultaneously in a parallel manner.

Figure 8:
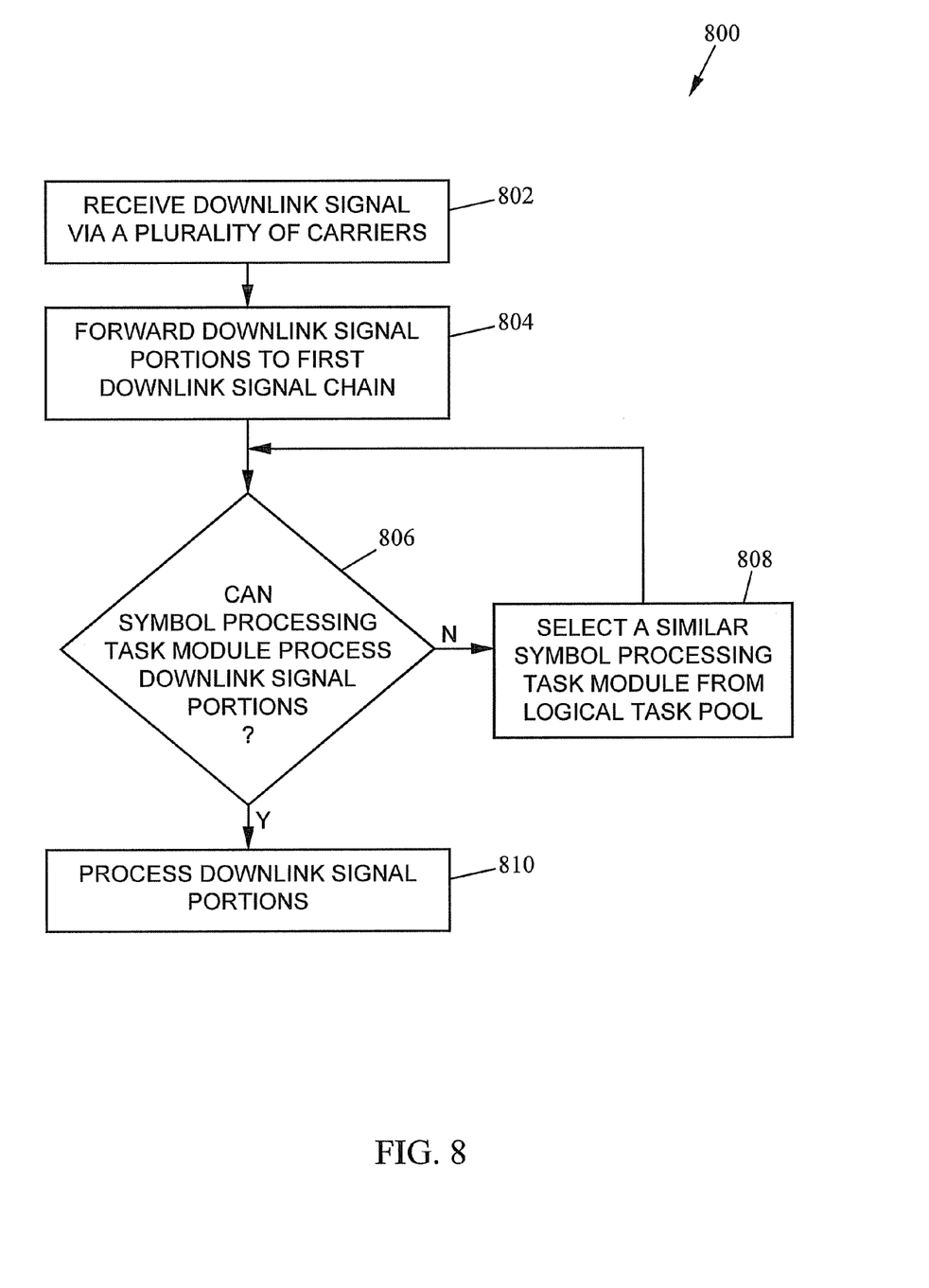
FIG. 8 is a flow chart illustrating exemplary overall steps for utilizing adaptive symbol processing in a multiple user equipment simulator according to an embodiment of the subject matter described herein.

FIG. 8 is a flow chart illustrating exemplary overall steps of a method 800 for utilizing adaptive symbol processing in a multi-UE simulator according to an embodiment of the subject matter described herein. In step 802, a downlink signal is received via a plurality of carriers. In one embodiment, a plurality of antenna interfaces at a multi-UE simulator respectively receives a downlink signal (e.g., an LTE signal) that is carried via a plurality of carriers. Specifically, each carrier includes a downlink signal portion of the downlink signal.

In step 804, the downlink signal portions are forwarded to a first downlink signal chain processing module. In one embodiment, all of the received downlink signal portions are forwarded to a symbol processing module in a first DL-SC processing module. In such an embodiment, the multi-UE simulator includes a plurality of DL-SC processing module s to which the first DL-SC processing module belongs.

In step 806, a determination is made as to whether a task module of the symbol processing module can handle the downlink signal portion. In one embodiment, the multi-UE simulator determines whether the processing capacity of a particular task module can process all of the portions of the downlink signal. If the particular task module can process the downlink signal portions, then method 800 proceeds to step 810. Otherwise, method 800 continues to step 808. In an alternate embodiment, the task module processing capability determination may be made prior to the initiation of the test simulation process.

At step 808, a similar symbol processing task module is selected from a logical task pool. In one embodiment, all of the task modules associated with the plurality of DL-SC processing modules of the multi-UE simulator are logically categorized or grouped in logical task pools of similar symbol processing task modules (e.g., task modules configured to perform the same processing task). After determining that a particular task module is unable to adequately handle the processing load associated with the received downlink signal portions, a similar task module is selected from the appropriate logical task pool. Method 800 then loops back to step 806 to confirm that the utilization of the additional task module is sufficient to handle the processing of the downlink signal portions. In an alternate embodiment, method 800 may proceed directly to step 808 where the downlink signal portions are processed.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for utilizing adaptive symbol processing in a multiple user equipment (multi-UE) simulator, the method comprising:

at a multi-UE simulator:
  receiving a downlink signal including a plurality of downlink signal portions, wherein each of the downlink signal portions is received via one of a plurality of carriers;
  assigning the plurality of carriers among a plurality of downlink signal chain processing modules included in the multi-UE simulator, wherein each downlink signal chain processing module includes a symbol processor; and
  forwarding, at each downlink signal chain processing module, the downlink signal portions from the assigned carriers to the symbol processor to be processed.

2. The method of claim 1 wherein the downlink signal chain processing modules are configured to process the downlink signal portions from the different carriers in parallel.

3. The method of claim 1 wherein the symbol processor includes a plurality of symbol processing task modules.

4. The method of claim 3 wherein the plurality of symbol processing task modules includes a cyclic prefix removal module, a fast Fourier transform module, a symbol truncation module, a subcarrier de-mapper module, a channel estimation module, and an equalization module.

5. The method of claim 1 wherein, at each downlink signal chain processing module, the downlink signal portions are serially processed by the symbol processing module via time-division multiplexing (TDM).

6. The method of claim 1 wherein the downlink signal chain processing modules are implemented using a field programmable gate arrays.

7. The method of claim 1 comprising providing, at each downlink signal chain processing module, the processed downlink signal portions to a resource de-mapping engine module.

8. The method of claim 1 wherein the downlink signal is received at the multi-UE simulator from a device under test.

9. The method of claim 8 wherein the device under test includes an evolved node B (eNodeB).

10. The method of claim 1 wherein the downlink signal comprises a long term evolution (LTE) downlink signal.

11. The method of claim 1 wherein the multi-UE simulator comprises a long term evolution (LTE) multi-UE simulator.

12. A system for utilizing adaptive symbol processing in a multiple user equipment (multi-UE) simulator, the system comprising:
  at least one antenna interface configured for receiving a downlink signal including a plurality of downlink signal portions, wherein each of the downlink signal portions is received via one of a plurality of carriers;
  a radio head unit configured for assigning the plurality of carriers among a plurality of downlink signal chain processing modules included in the multi-UE simulator; and
  a plurality of downlink signal chain processing modules, wherein each downlink signal chain processing module includes a symbol processing module that is configured to receive, from the radio head, the downlink signal portions associated with the assigned carriers.

13. The system of claim 12 wherein the downlink signal chain processing modules are configured to process the downlink signal portions from the different carriers in parallel.

14. The system of claim 12 wherein the symbol processing module includes a plurality of symbol processing task modules.

15. The system of claim 14 wherein the plurality of symbol processing task modules includes a cyclic prefix removal module, a fast Fourier transform module, a symbol truncation module, a subcarrier de-mapper module, a channel estimation module, and an equalization module.

16. The system of claim 12 wherein, at each downlink signal chain processing module, the downlink signal portions are serially processed by the symbol processing module via time-division multiplexing (TDM).

17. The system of claim 12 wherein the downlink signal chain processing modules are implemented using a field programmable gate arrays.

18. The system of claim 12 wherein the symbol processing module at each downlink signal chain processing module is further configured for providing the processed downlink signal portions to a resource de-mapping engine module.

19. The system of claim 12 wherein the downlink signal is received by the at least one antenna interface on a multi-UE simulator from a device under test.

20. The system of claim 19 wherein the device under test includes an evolved node B (eNodeB).

21. The system of claim 12 wherein the downlink signal comprises a long term evolution (LTE) downlink signal.

22. The system of claim 12 wherein the multi-UE simulator comprises a long term evolution (LTE) multi-UE simulator.

23. A method for utilizing adaptive symbol processing in a multiple user equipment (multi-UE) simulator, the method comprising:
  at a multi-UE simulator:
    receiving a downlink signal including a plurality of downlink signal portions, wherein each of the downlink signal portions is received via one of a plurality of carriers;
    forwarding the downlink signal portions to a first downlink signal chain processing module belonging to a plurality of downlink signal chain processing modules, wherein symbol processing task modules associated with the plurality of downlink signal chain processing modules are grouped in logical task pools of similar symbol processing task modules;
    processing the downlink signal portions using the symbol processing task modules associated with the first downlink signal chain processing module; and
    in the event the processing capabilities of a first symbol processing task module in the first downlink signal chain processing module is exceeded, selecting a similar symbol processing task module from the logical task pool associated with the first symbol processing task module to assist with the processing of the downlink signal portions.

24. The method of claim 23 wherein the downlink signal chain processing modules are configured to process the downlink signal portions from the different carriers in parallel.

25. The method of claim 23 wherein the symbol processing module includes a plurality of symbol processing task modules.

26. The method of claim 25 wherein the plurality of symbol processing task modules includes a cyclic prefix removal module, a fast Fourier transform module, a symbol truncation module, a subcarrier de-mapper module, a channel estimation module, and an equalization module.

27. The method of claim 23 wherein, at each downlink signal chain processing module, the downlink signal portions are serially processed by the symbol processing module via time-division multiplexing (TDM).

28. The method of claim 23 wherein the downlink signal chain processing modules are implemented using a field programmable gate arrays.

29. The method of claim 23 comprising providing, at each downlink signal chain processing module, the processed downlink signal portions to a resource de-mapping engine module.

30. The method of claim 23 wherein the downlink signal is received at the multi-UE simulator from a device under test.

31. The method of claim 23 wherein the device under test includes an evolved node B (eNodeB).

32. The method of claim 23 wherein the downlink signal comprises a long term evolution (LTE) downlink signal.

33. The method of claim 23 wherein the multi-UE simulator comprises a long term evolution (LTE) multi-UE simulator.

34. A system for utilizing adaptive symbol processing in a multiple user equipment (multi-UE) simulator, the method comprising:

at least one antenna interface configured for receiving a downlink signal including a plurality of downlink signal portions, wherein each of the downlink signal portions is received via one of a plurality of carriers;

a plurality of downlink signal chain processing modules including a first downlink chain processing module configured for receiving the downlink signal portions and for processing the downlink signal portions, wherein each of the plurality of downlink signal chain processing modules includes a plurality of symbol processing task modules that are collectively grouped in logical task pools of similar symbol processing task modules; and a selection module configured for selecting, in the event a first symbol processing task module included in the first downlink signal chain processing module is unable to process the downlink signal portions, a similar symbol processing task module from the logical task pool associated with a first symbol processing task module to assist with the processing of the downlink signal portions.

35. The system of claim 34 wherein the symbol processing module includes a plurality of symbol processing task modules.

36. The system of claim 35 wherein the plurality of symbol processing task modules includes a cyclic prefix removal module, a fast Fourier transform module, a symbol truncation module, a subcarrier de-mapper module, a channel estimation module, and an equalization module.

37. The system of claim 34 wherein, at each downlink signal chain processing module, the downlink signal portions are serially processed by the symbol processing module via time-division multiplexing (TDM).

38. The system of claim 34 wherein the downlink signal chain processing modules are implemented using a field programmable gate arrays.

39. The system of claim 34 wherein the symbol processing module is further configured for providing the processed downlink signal portions to a resource de-mapping engine module.

40. The system of claim 34 wherein the downlink signal is received by the at least one antenna interface on a multi-UE simulator from a device under test.

41. The system of claim 40 wherein the device under test includes an evolved node B (eNodeB).

42. The system of claim 34 wherein the downlink signal comprises a long term evolution (LTE) downlink signal.

43. The system of claim 34 wherein the multi-UE simulator comprises a long term evolution (LTE) multi-UE simulator.

44. A non-transitory computer readable medium having stored thereon executable instructions that when executed by the processor of a computer controls the computer to perform steps comprising:

at a multi-UE simulator:

receiving a downlink signal including a plurality of downlink signal portions, wherein each of the downlink signal portions is received via one of a plurality of carriers;

assigning the plurality of carriers among a plurality of downlink signal chain processing modules included in the multi-UE simulator, wherein each downlink signal chain processing module includes a symbol processing module; and forwarding, at each downlink signal chain processing module, the downlink signal portions from the assigned carriers to the symbol processing module to be processed.

45. A non-transitory computer readable medium having stored thereon executable instructions that when executed by the processor of a computer controls the computer to perform steps comprising:

at an LTE multi-UE simulator:

receiving a downlink signal including a plurality of downlink signal portions, wherein each of the downlink signal portions is received via one of a plurality of carriers;

forwarding the downlink signal portions to a first downlink signal chain processing module belonging to a plurality of downlink signal chain processing modules, wherein symbol processing task modules associated with the plurality of downlink signal chain processing modules are grouped in logical task pools of similar symbol processing task modules;

processing the downlink signal portions using the symbol processing task modules associated with the first downlink signal chain processing module; and in the event the processing capabilities of a first symbol processing task module in the first downlink signal chain processing module is exceeded, selecting a similar symbol processing task module from the logical task pool associated with the first symbol processing task module to assist with the processing of the downlink signal portions.

* * * * *